United States Patent [19]

van der Steen et al.

[11] 4,361,779
[45] Nov. 30, 1982

[54] LAMP HAVING A LAMP VESSEL MADE OF QUARTZ GLASS, QUARTZ GLASS AND METHOD OF PREPARING QUARTZ GLASS

[75] Inventors: Gerardus H. A. M. van der Steen; Eddy F. C. Van Hove, both of Eindhoven, Netherlands

[73] Assignee: U.S. Philips Corporation, New York, N.Y.

[21] Appl. No.: 225,959

[22] Filed: Jan. 19, 1981

[30] Foreign Application Priority Data

Oct. 17, 1980 [NL] Netherlands ............... 8000298

[51] Int. Cl.³ .............. H01J 17/16; C03C 3/06; H01J 61/30; H01K 1/28
[52] U.S. Cl. .................................. 313/221; 501/54
[58] Field of Search ............... 106/52; 313/221; 501/54

[56] References Cited

U.S. PATENT DOCUMENTS

| | | | |
|---|---|---|---|
| 3,764,286 | 10/1973 | Antczak et al. | 65/134 |
| 3,848,152 | 11/1974 | Schultz | 106/52 |
| 3,850,602 | 11/1974 | Brüning | 106/52 |
| 3,935,119 | 1/1976 | Barber et al. | 106/52 |

OTHER PUBLICATIONS

Klimashina E. V. et al., "Effect of Small Additions of Some Elements on the Spectral Properties of Vitreous Silica", Sovj. J. Glass Physics and Chem., 1975, 1 (2), pp. 144–148.

Primary Examiner—Mark Bell
Attorney, Agent, or Firm—Robert S. Smith

[57] ABSTRACT

A quartz glass lamp vessel 1 or 21 is used in many types of lamps. Sometimes it is expedient to absorb a certain portion of the emission spectrum. In accordance with the prior art this is possible by including rare earth metal oxides in the quartz glass.

The solubility of rare earth metal oxides in quartz glass is, however, limited.

According to the invention, quartz glass is used which contains an alkali metal oxide and optionally, an alkaline earth metal oxide, in addition to a rare earth metal oxide. The alkali metal oxide increases the solubility of the rare earth metal oxide, so that rare earth metal oxides can be used in larger concentrations. This results in glasses which have a higher degree of absorption, from which lamp vessels can be produced.

9 Claims, 6 Drawing Figures

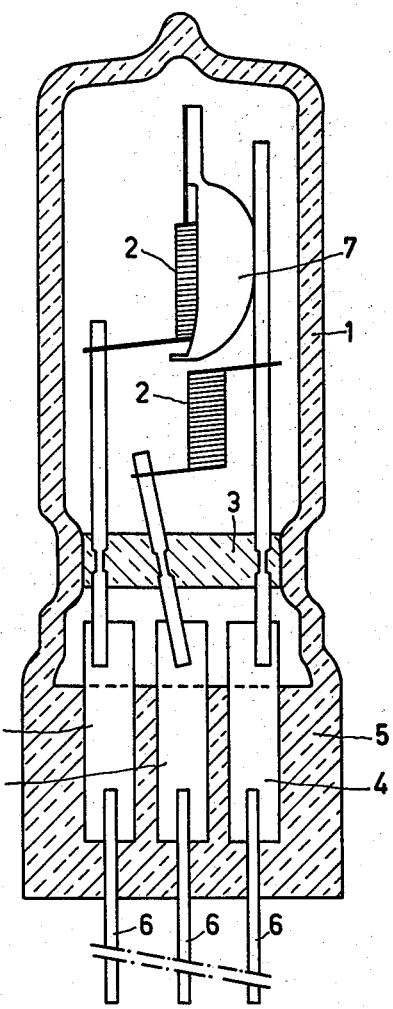
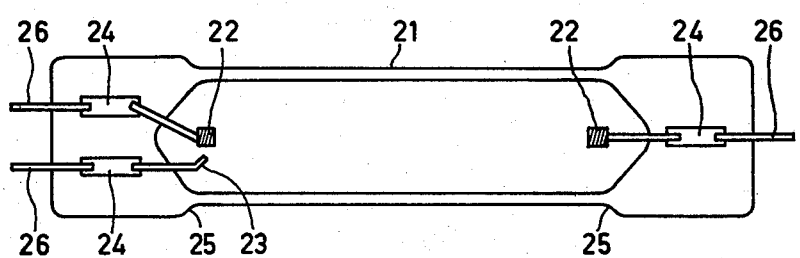
FIG.5
FIG.6

LAMP HAVING A LAMP VESSEL MADE OF QUARTZ GLASS, QUARTZ GLASS AND METHOD OF PREPARING QUARTZ GLASS

The invention relates to a lamp having a lamp vessel of quartz glass, to quartz glass and to a method of preparing quartz glass.

Several types of lamps have a quartz glass lamp vessel. Such lamp vessels are generally used when they are subjected to high temperatures (for example upwards of 400° C.) during operation of the lamp. Examples of these lamps are mercury vapor discharge lamps and halogen incandescent lamps.

During operation, lamps emit electromagnetic radiation. In practice it is often desirable to absorb a portion of this radiation. This may be desirable because the emission spectrum of the lamp comprises dangerous radiation, such as ultraviolet (UV) radiation of short wavelengths, or because the lamp must emit light of a certain colour. A selectively operating filter may be used to absorb a portion of the radiation.

A simpler solution would be to produce the lamp vessel from a quartz glass which selectively absorbs a portion of the emission spectrum of the lamp.

From E. V. Klimashina et al., "Effect of small additions of some elements on the spectral properties of vitreous silica", Sovj. J. Glass Physics & Chem., 1975, 1(2), pages 144–148 it is known that the addition of 0–0.2% $CeO_2$ to quartz causes the quartz to absorb ultraviolet radiation and that the addition of 0–0.2% $Eu_2O_3$ colours the glass yellow. It is further described that the addition of more than 0.2% $CeO_2$ or of more than 0.2% $Eu_2O_3$ renders the glass "macro non-uniform". For many uses the addition of 0.2% $CeO_2$ or $Eu_2O_3$ results in an insufficient absorption.

The invention provides a lamp having a lamp vessel made of a quartz glass which has the desired degree of absorption.

The lamp according to the invention is characterized in that the quartz glass from which the lamp vessel has been produced contains 0.1 to 3.0% by weight of alkali metal oxide, 0.2 to 5.0% by weight of rare earth metal oxide and 0 to 0.5% by weight of alkaline earth metal oxide.

The quartz glass according to the invention is characterized in that it contains 0.1 to 3.0% by weight of alkali metal oxide, 0.2 to 5.0% by weight of rare earth metal oxide and 0 to 0.5% by weight of alkaline earth metal oxide.

The invention is based on the surprising recognition of the fact that the solubility of the rare earth metal oxides in quartz glass can be increased by the addition of a small quantity of alkali metal oxide. When a rare earth metal oxide and an alkali metal oxide are added simultaneously, clear glasses are obtained even when the concentration of rare earth metal oxide exceeds 0.2% by weight. It was further found that the absorption properties of the quartz glass is also influenced by the quantity of alkali metal oxide added. The addition of alkaline earth metal oxides improves the properties of the glass (it increases the stability) and the melting properties (less bubbles). The absorption properties are also influenced by the added alkaline earth metal oxide.

According to the invention, halogen incandescent lamps for cars which must satisfy the requirements imposed on them in France (yellow light) preferably have a lamp vessel which is made of a quartz glass containing 1 to 3.0% by weight of alkali metal oxide, 1 to 3.5% by weight of europium oxide and 0 to 0.5% by weight of alkaline earth metal oxide.

Mercury vapor discharge lamps which are used either for health reasons or in view of their cosmetic effect (tanning of the skin) preferably have a lamp vessel which is made of a quartz glass containing 0.1 to 1% by weight alkali metal oxide, 0.3 to 1.0% by weight of praseodymium oxide and 0 to 0.5% by weight of alkaline earth metal oxide. Such a quartz glass fully absorbs the UV radiation having a wavelength of 253 nm and less, which is harmful to the human body (at the relevant temperature of approximately 400°–600° C.).

In this description, in the examples and in the claims quartz glass must always be understood to mean a glass containing more than 90% by weight of $SiO_2$. All percentages are in all cases calculated on the basis of the quantity of raw materials used.

The invention relates to lamp vessels made of quartz glass and to quartz glass containing 0.1 to 3.0% by weight of alkali metal oxide, 0.2 to 5.0% by weight of rare earth metal oxide and 0 to 0.5% weight of alkaline earth metal oxide. The oxides of all rare earth metals may be used as the rare earth metal oxides; however, the oxides of cerium (Ce), europium (Eu), gadolinium (Gd), praseodymium (Pr) and terbium (Tb) are preferred.

The quartz glass according to the invention may be prepared in accordance with any suitable method. The method described in U.S. Pat. No. 3,764,286 is a particularly satisfactory method, according to which the raw materials are melted in a hydrogen gas atmosphere. This publication is incorporated in this description by reference.

The invention will now be further explained by way of example with reference to the accompanying Figures:

FIG. 5 shows a suitable lamp according to the invention (a double filament halogen incandescent lamp for motorcars) and FIG. 6 shows a suitable mercury vapour discharge lamp according to the invention.

Figure 1:
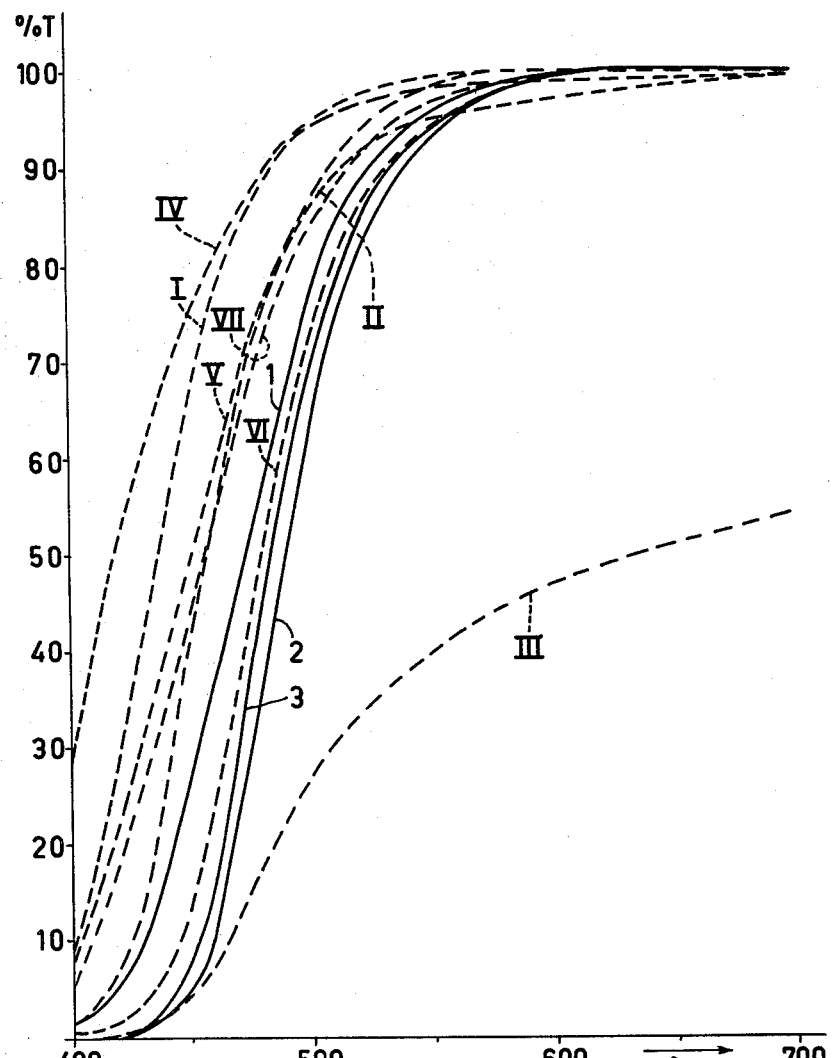
FIG. 1 shows the absorption curves at 20° C. of several glasses according to the invention (nos. 1, 2, 3 and IV to VII inclusive) and of glasses I, II and III.

In the FIGS. 1 to 4 inclusive, the wavelength in nm of 1.5 mm thick samples is plotted along the horizontal axis and the transmission T in expressed percent is plotted along the vertical axis. The transmission is corrected for reflection. The numbers identifying the curves shown in FIGS. 1 to 4 inclusive relate to the respective glasses whose composition are defined in Tables A and C.

FIG. 5 shows a halogen double filament incandescent lamp for motor cars. The lamp comprises a lamp vessel of a quartz glass containing 1 to 3% alkali metal oxide, 1 to 3.5% europium oxide and 0 to 0.5% alkaline earth metal oxide. This lamp is suitable for the French market. Reference numeral 2 denotes the two filaments which can glow independently from one another. The lamp furthermore comprises a support 3, metal strips 4 for current feed-through, a pinched seal 5, current feed-through pins 6 and a reflector 7.

FIG. 6 shows a mercury vapour discharge lamp having a lamp vessel 21 of a quartz glass containing 0.2 to 1% alkali metal oxide, 0.2 to 0.4% praseodymium oxide and 0 to 0.5% alkaline earth metal oxide. The lamp further comprises (coiled) electrodes 22, an auxiliary electrode 23, metal strips 24 for current feed-through purposes, a pinched seal 25 and current feed-through pins 26.

The invention is of course not limited to the embodiments shown in FIGS. 5 and 6 of halogen incandescent lamps and mercury vapour discharge lamps respectively. In addition, the invention also relates to other types of lamps in so far as they comprise a lamp vessel of quartz glass according to the invention.

The quartz glass according to the invention may be used for the production of lamp vessels, radiation filters etc.

The invention will be further explained with reference to some examples. Example I relates to quartz glasses containing $Eu_2O_3$, Example II to quartz glass containing $Pr_2O_3$.

EXAMPLE I

In a high-frequency furnace finely ground, purified rock-crystal ($SiO_2$) was fused in a molybdenum crucible in a hydrogen gas atmosphere together with the required quantity of alkali metal oxide, rare earth metal oxide and, optionally, alkaline earth metal oxide. The alkali metal oxide and alkaline earth metal oxide were added in the form of a pre-prepared glass powder of alkali metal oxide, silicon dioxide and alkaline earth metal oxide. Samples having a diameter of approximately 20 mm and a thickness of approximately 1.5 mm were made.

The transmission properties of these samples were measured by means of a spectrophotometer, corrected for reflections and converted to a thickness of 1.5 mm. The saturation degree and the dominant wavelength were calculated from the corrected spectra. The terms saturation degree and dominant wavelength are well known in optics (see: C. R. Bamford, Color generation and control in glass, Elsevier, 1977, pages 22 and 23). Glass for French car lamps must have a dominant wavelength between 5750 Å and 5850 Å., a transmission of more than 84,8% and a degree of saturation from 0.85 to 0.98. The saturation degree and the transmission depend on the glass thickness. For practical reasons, glass thicknesses of not more than 1.8 mm are used in the production of halogen incandescent lamps for motor cars.

During operation the temperature of the lamp vessel of such halogen incandescent lamps is approximately 400°–600° C. As will be apparent from the Figures and from Table B, the transmission is influenced by the temperature. So, when judging the different glasses the absorption values must be measured at high temperatures.

Figure 2:
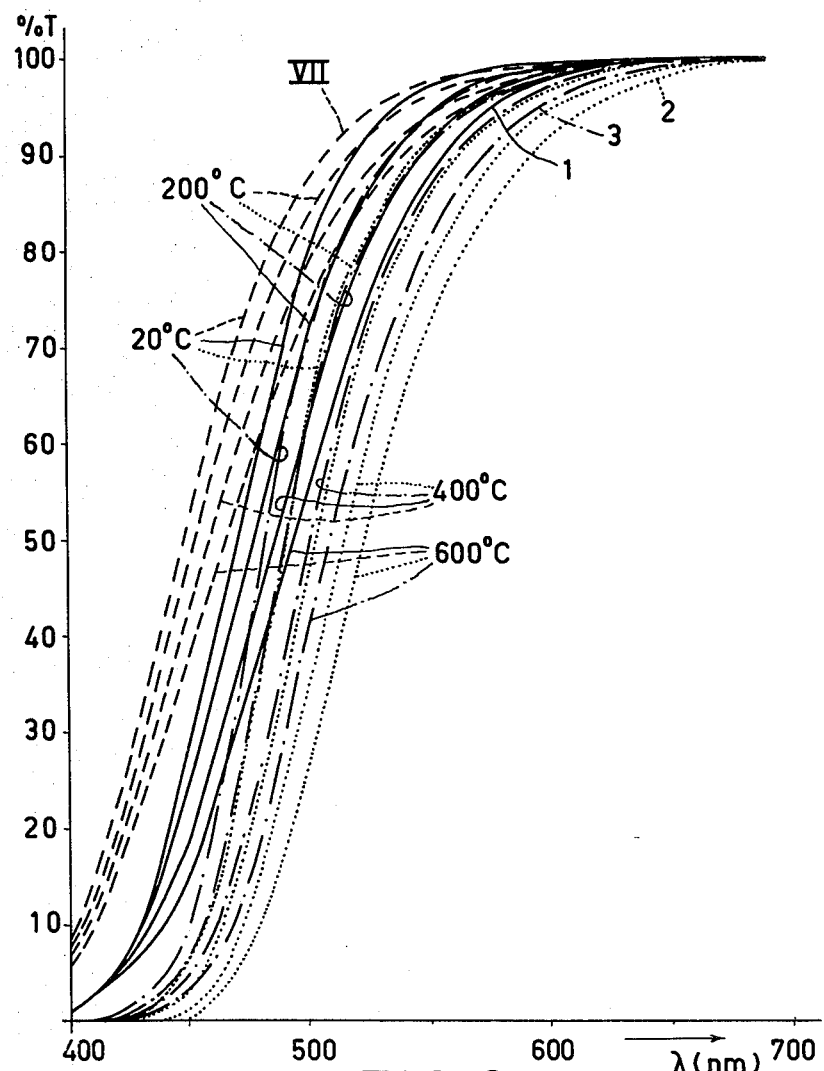
FIG. 2 shows the absorption curves at different temperatures of the glasses VII, 1, 2 and 3 of FIG. 1.

The following Table A shows the composition of glasses I to VII, inclusive, and of glasses 1 to 3 inclusive. Glasses I, II and III are outside the invention. Glasses 1, 2 and 3 show preferred compositions. FIG. 1 shows the absorption curves (at 20° C.) of these glasses. Glass III containing 2.85% by weight $Eu_2O_3$ was turbid. FIG. 2 shows the absorption curves of the glasses VII, 1, 2 and 3 at different temperatures. All glasses (i.e. I to VII, inclusive, and 1 to 3, inclusive) had a dominant wavelength which at all measured temperatures was located within the above-defined range from 5750 Å to 5850 Å.

The following Table B shows the maximum thickness d (in mm) to obtain a transmission (D) of over 84.8% and the minimum thickness d (in mm) to obtain a saturation degree (P) of over 0.85.

When it is a requirement that the wall thickness shall not be more than 1.8 mm, only the glasses 1, 2 and 3 according to the invention satisfy the requirements imposed.

TABLE A

| Glass No. | $Eu_2O_3$ wt. % | $K_2O$ wt. % | MgO wt. % | $SiO_2$ wt. % |
|---|---|---|---|---|
| I | 0.58 | — | — | 99.42 |
| II | 1.44 | — | — | 98.56 |
| III | 2.85 | — | — | 97.15 |
| IV | 0.57 | 0.73 | — | 98.70 |
| V | 1.41 | 0.73 | — | 97.86 |
| VI | 2.78 | 0.73 | — | 96.49 |
| VII | 0.55 | 1.50 | — | 97.95 |
| 1 | 1.37 | 1.50 | — | 97.13 |
| 2 | 2.70 | 1.50 | — | 95.80 |
| 3 | 2.90 | 1.40 | 0.29 | 95.41 |

TABLE B

| Glass No. | Temperature transm. measurement (°C.) | Maximum thickness d (mm) for D >84.8% | Minimum thickness d (mm) for P >0.85 |
|---|---|---|---|
| I | 20 | — | 5.3 |
| II | 20 | 3.6 | 2.35 |
| III | 20 | turbid preparation; | $Eu_2O_3$ not dissolved |
| IV | 20 | 14.96 | 8.96 |
| V | 20 | 11.60 | 2.70 |
| VI | 20 | 2.32 | 1.0 |
| VII | 20 | 5.3 | 2.75 |
|  | 200 | 4.55 | 2.45 |
|  | 400 | 3.20 | 2.1 |
|  | 600 | 2.75 | 1.85 |
| 1 | 20 | 3.3 | 1.85 |
|  | 200 | 2.56 | 1.6 |
|  | 400 | 1.92 | 1.4 |
|  | 600 | 1.56 | 1.25 |
| 2 | 20 | 3.5 | 0.72 |
|  | 200 | 2.6 | 0.57 |
|  | 400 | 1.25 | 0.47 |
|  | 600 | 0.90 | 0.45 |
| 3 | 20 | 4.70 | 0.95 |
|  | 200 | 2.70 | 0.77 |
|  | 400 | 1.85 | 0.68 |
|  | 600 | 1.30 | 0.62 |

EXAMPLE II

In the same way as described for Example I, glasses were made with a composition as shown in Table C. Of these glasses nos. VIII, IX and X fall outside the claimed invention. Glasses 4 and 5 show glasses of preferred composition.

TABLE C

| Glass No. | $PrO_2$ wt. % | $K_2O$ wt. % | BaO wt. % | $Al_2O_3$ wt. % | $SiO_2$ wt. % |
|---|---|---|---|---|---|
| VIII | 0.11 | — | — | — | 99.89 |
| IX | 0.27 | — | — | — | 99.73 |
| X | 0.11 | 0.145 | 0.04 | 0.015 | 99.69 |
| XI | 0.27 | 0.145 | 0.04 | 0.015 | 99.53 |
| 4 | 0.54 | 0.145 | 0.04 | 0.015 | 99.26 |
| 5 | 0.54 | 0.29 | 0.08 | 0.03 | 99.06 |
| XII | 1.08 | 0.58 | 0.16 | 0.06 | 98.12 |

Figure 3:
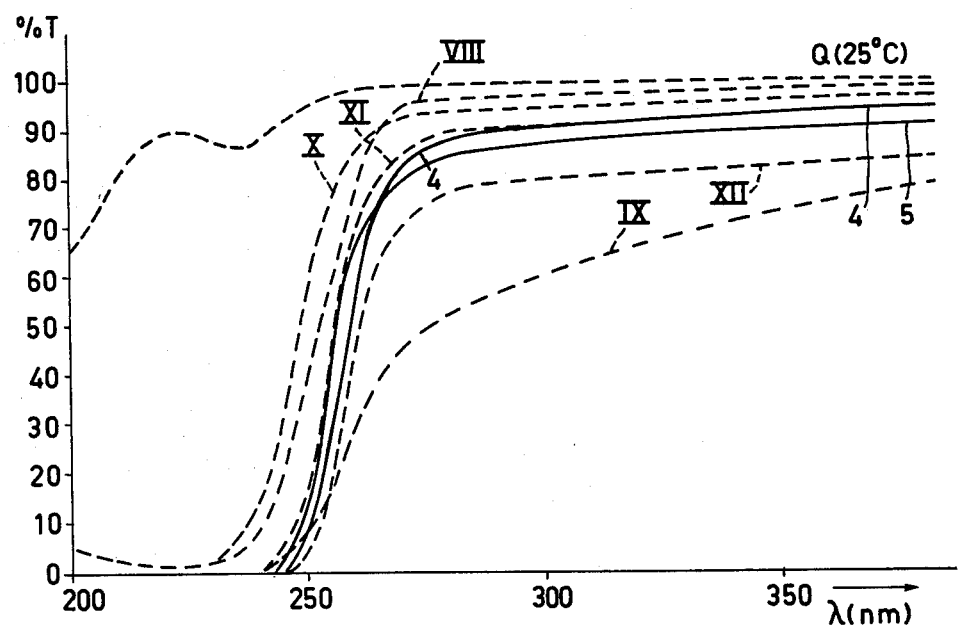
FIG. 3 shows the absorption curves at 20° C. of the glasses VIII to XII, inclusive, of the glasses 4 and 5 and of quartz glass (Q)
Figure 4:
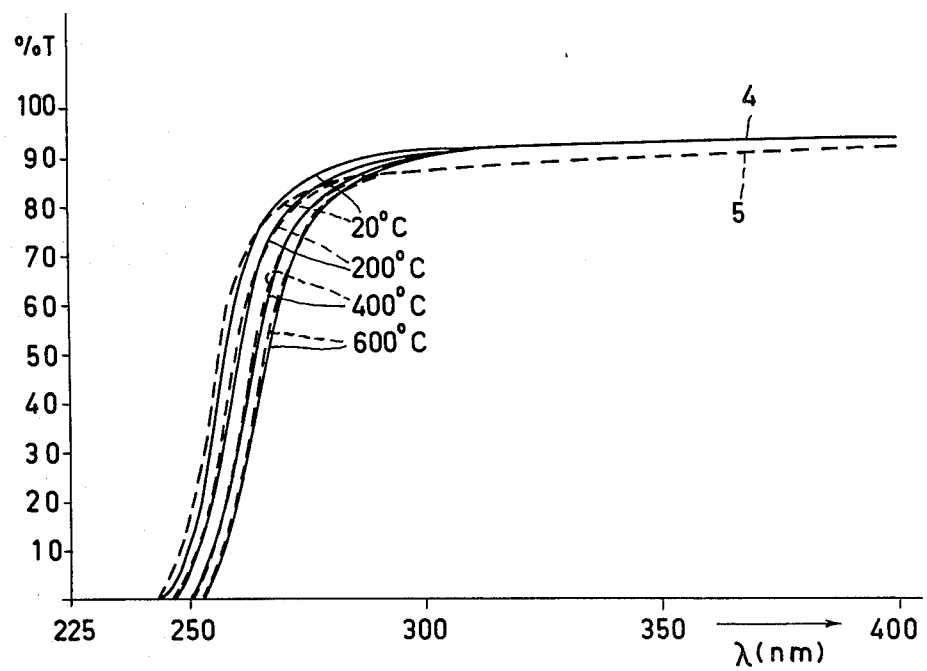
FIG. 4 shows the absorption curves at different temperatures of the glasses 4 and 5.

The absorption curves of the glasses shown in Table C are included in FIG. 3 (at 20° C.) and in FIG. 4 (at different temperatures). Mercury vapour discharge lamps must sometimes satisfy the requirement that in operation, when the temperature of the glass is from 400°–600° C., they shall not emit UV light having a wavelength of 253 nm or less. The glasses 4 and 5 according to the invention satisfy this requirement; the glasses VIII, X and XI do not satisfy this requirement or do not sufficiently transmit light of longer wavelengths (glasses IX and XII).

What is claimed is:

1. An incandescent lamp having a filament, a lamp vessel of quartz glass, and leads extending through said vessel, wherein the improvement comprises said quartz glass containing 0.1 to 3.0% by weight of alkali metal oxide, 0.2 to 5.0% by weight of rare earth metal oxide and 0 to 0.5% by weight of alkaline earth metal oxide.

2. A lamp as claimed in claim 1, wherein said quartz glass contains 1 to 3.5% by weight of europium oxide and 0 to 0.5% by weight of alkaline earth metal oxide.

3. A lamp as claimed in claim 1, wherein said quartz glass contains 0.1 to 1.0% by weight of alkali metal oxide, 0.3 to 1.0% by weight of praseodymium oxide and 0 to 0.5% by weight of alkaline earth metal oxide.

4. A discharge lamp having first and second electrodes, a lamp vessel of quartz glass, a gas in said vessel and leads extending through said vessel to each of said electrodes, wherein the improvement comprises said quartz glass containing 0.1 to 3.0% by weight of alkali metal oxide, 0.2 to 5.0% by weight of rare earth metal oxide and 0 to 0.5% by weight of alkaline earth metal oxide.

5. A lamp as claimed in claim 4, characterized in that the quartz glass contains 1 to 3.5% by weight of europium oxide and 0 to 0.5% by weight of alkaline earth metal oxide.

6. A lamp as claimed in claim 4, characterized in that the quartz glass contains 0.1 to 1.0% by weight of alkali metal oxide, 0.3 to 1.0% by weight of praseodymium oxide and 0 to 0.5% by weight of alkaline earth metal oxide.

7. Quartz glass characterized in that it contains 0.1 to 3.0% by weight of alkali metal oxide, 0.2 to 5.0% by weight of rare earth metal oxide and 0 to 0.5% by weight of alkaline earth metal oxide.

8. Quartz glass as claimed in claim 7, characterized in that it contains 1 to 3.0% by weight of alkali metal oxide, 1 to 3.5% by weight of europium oxide and 0 to 0.5% by weight of alkaline earth metal oxide.

9. Quartz glass as claimed in claim 7, characterized in that it contains 0.1 to 1.0% by weight of alkali metal oxide, 0.3 to 1.0% by weight of praseodynium oxide and 0 to 0.5% by weight of alkaline earth metal oxide.

* * * * *

UNITED STATES PATENT AND TRADEMARK OFFICE
CERTIFICATE OF CORRECTION

PATENT NO. : 4,361,779

DATED : November 30, 1982

INVENTOR(S) : GERARDUS H.A.M. VAN DER STEEN ET AL

It is certified that error appears in the above—identified patent and that said Letters Patent is hereby corrected as shown below:

In the Title Page:

The Foreign Application Priority Data should be changed from "October 17, 1980" to -- January 17, 1980--.

Signed and Sealed this

Eighth Day of March 1983

[SEAL]

Attest:

GERALD J. MOSSINGHOFF

*Attesting Officer*     *Commissioner of Patents and Trademarks*